(12) United States Patent
Zanoon et al.

(10) Patent No.: US 11,790,388 B2
(45) Date of Patent: Oct. 17, 2023

(54) SYSTEM, METHOD, AND COMPUTER PROGRAM FOR AUTOMATIC COUPON CODE FILL IN A MOBILE APPLICATION

(71) Applicant: Rakuten Group, Inc., Tokyo (JP)

(72) Inventors: Naveed Zanoon, Melbourne (AU); Adam Roth, Sunshine Coast (AU); Feng Xie, Melbourne (AU); Mujtaba Hussain, Melbourne (AU); James Seymour-Lock, New York, NY (US)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/490,732

(22) Filed: Sep. 30, 2021

(65) Prior Publication Data
US 2023/0095187 A1  Mar. 30, 2023

(51) Int. Cl.
| | |
|---|---|
| *G06Q 30/02* | (2023.01) |
| *G06Q 30/0207* | (2023.01) |
| *G06F 16/953* | (2019.01) |
| *H04W 4/30* | (2018.01) |
| *G06N 3/02* | (2006.01) |
| *G06F 40/174* | (2020.01) |

(52) U.S. Cl.
CPC ....... *G06Q 30/0222* (2013.01); *G06F 16/953* (2019.01); *G06F 40/174* (2020.01); *G06N 3/02* (2013.01); *G06Q 30/0239* (2013.01); *H04W 4/30* (2018.02)

(58) Field of Classification Search
None
See application file for complete search history.

(56) References Cited

U.S. PATENT DOCUMENTS

| | | | |
|---|---|---|---|
| 10,614,381 B2 | 4/2020 | Hoffman et al. | |
| 10,698,967 B2 | 6/2020 | Shen et al. | |
| 11,068,921 B1 * | 7/2021 | Engle | G06Q 30/0239 |

(Continued)

FOREIGN PATENT DOCUMENTS

| | | | | |
|---|---|---|---|---|
| CN | 201110040468 | * | 2/2011 | G06F 17/30 |
| WO | WO-2020061064 A1 | * | 3/2020 | G06Q 20/387 |

OTHER PUBLICATIONS

Automatic extraction and provision of coupon codes for online shopping, IP.com No. IPCOM000257141D IP.com Electronic Publication Date: Jan. 16, 2019.*

(Continued)

*Primary Examiner* — David J Stoltenberg
(74) *Attorney, Agent, or Firm* — Lessani Law Group, PC

(57) ABSTRACT

The present disclosure relates to a system, method, and computer program for automatic coupon code fill in a mobile application. The system identifies a checkout page in a WebView of a mobile application and extracts field data from the checkout page. The system identifies a coupon code field and a cart total field from the field data. The system obtains one or more coupon code(s) and tests the one or more coupon code(s) in the checkout page. The one or more coupon code(s) are tested in the identified coupon code field to determine whether any of the coupon code(s) cause the value associated with the cart total field to decrease. In response to one or more coupon code(s) providing a reward on the checkout page, the system identifies a best coupon code, which it inserts in the identified coupon code field in the checkout page in the mobile application.

18 Claims, 3 Drawing Sheets

(56) References Cited

U.S. PATENT DOCUMENTS

| | | | | |
|---|---|---|---|---|
| 2009/0177959 | A1* | 7/2009 | Chakrabarti | G06F 16/951 715/234 |
| 2011/0106600 | A1* | 5/2011 | Malik | G06Q 30/0222 705/14.23 |
| 2011/0153401 | A1* | 6/2011 | Jellema | G06Q 30/02 705/14.26 |
| 2011/0173527 | A1* | 7/2011 | Zunger | G06F 40/143 715/234 |
| 2014/0032267 | A1 | 1/2014 | Smith et al. | |
| 2014/0074584 | A1* | 3/2014 | Fisher | G06Q 30/0207 705/14.39 |
| 2014/0278880 | A1* | 9/2014 | Lemphers | G06Q 30/0222 705/14.26 |
| 2015/0106181 | A1* | 4/2015 | Kluth | G06Q 30/0222 705/14.23 |
| 2016/0217484 | A9* | 7/2016 | Hudson | G06Q 30/0222 |
| 2017/0185894 | A1 | 6/2017 | Volkovs et al. | |
| 2017/0345075 | A1* | 11/2017 | Khandelwal | G06Q 30/0623 |
| 2018/0315069 | A1* | 11/2018 | Kamireddy | G06Q 30/0633 |
| 2019/0385185 | A1* | 12/2019 | Shiffert | G06Q 30/0225 |
| 2020/0134698 | A1* | 4/2020 | Dabral | G06Q 30/0633 |
| 2020/0357012 | A1* | 11/2020 | Kendall | G06Q 20/3433 |
| 2021/0073846 | A1* | 3/2021 | Hudson | G06F 9/45512 |
| 2021/0089710 | A1* | 3/2021 | Chernov | G06F 40/174 |
| 2021/0103975 | A1 | 4/2021 | Walters et al. | |
| 2021/0125262 | A1* | 4/2021 | Corrieri | G06Q 20/20 |
| 2021/0150337 | A1 | 5/2021 | Raziperchikolaei | |
| 2021/0182892 | A1* | 6/2021 | Henderson | G06Q 30/0222 |
| 2021/0191990 | A1 | 6/2021 | Shi et al. | |
| 2022/0114643 | A1 | 4/2022 | Raziperchikolaei | |
| 2022/0222735 | A1* | 7/2022 | Senthil | H04L 67/1396 |
| 2022/0318791 | A1* | 10/2022 | Ballenger | G06Q 20/387 |

OTHER PUBLICATIONS

Providing an Enhanced Online Shopping Experience to Users Through a Web Browser Extension/Mobile App, Watfa et al., IP.com No. IPCOM000265335D IP.com Electronic Publication Date: Mar. 30, 2021.*

Classification-based Adaptive Web Scraper, Ujwal et al., 2017 16th IEEE International Conference on Machine Learning and Applications.*

Automatic extraction and provision of coupon codes for online shopping; IPCOM000257141D, IP.com Electronic Publication Date: Jan. 16, 2019.*

Best Offer Recommendation Service, Javkar et al., 2016 Intl. Conference on Advances in Computing, Communications and Informatics (ICACCI), Sep. 21-24, 2016, Jaipur, India.*

Bronstein et al., "Data Fusion through Cross-modality Metric Learning using Similarity-Sensitive Hashing", 2010, pp. 1-8.

Cao et al., "Collective Deep Quantization for Efficient Cross-Modal Retrieval", Proceedings of the Thirty-First AAAI Conference on Artificial Intelligence, 2017, pp. 3974-3980.

Cao et al., "Correlation Hashing Network for Efficient Cross-Modal Retrieval", 2016, pp. 1-12.

Cheng et al., "Wide & Deep Learning for Recommender Systems", DLRS '16, Sep. 15, 2016, pp. 1-4.

Deng et al., "DeepCF: A Unified Framework of Representation Learning and Matching Function Learning in Recommender System", 2019, pp. 1-9.

Ding et al., "Collective Matrix Factorization Hashing for Multimodal Data", 2014, pp. 4321-4328.

Dong et al., "A Hybrid Collaborative Filtering Model with Deep Structure for Recommender Systems", Proceedings of the Thirty-First AAAI Conference on Artificial Intelligence, 2017, pp. 1309-1315.

Gong et al., "Learning Binary Codes for High-Dimensional Data Using Bilinear Projections", 2013, pp. 484-491.

Guo et al., "DeepFM: A Factorization-Machine based Neural Network for CTR Prediction", Proceedings of the Twenty-Sixth International Joint Conference on Artificial Intelligence, 2017, pp. 1725-1731.

He et al., "Neural Collaborative Filtering", WWW 2017, Apr. 3-7, 2017, pp. 1-10.

He, et al., "Neural Collaborative Filtering" Proceedings of the 26th International Conference on World Wide Web (WWW '17) [online], Apr. 3, 2017, pp. 173-182.

He et al., "Neural Factorization Machines for Sparse Predictive Analytics", SIGIR '17, Aug. 7-11, 2017, pp. 355-364.

He et al., "Outer Product-based Neural Collaborative Filtering", Proceedings of the Twenty-Seventh International Joint Conference on Artificial Intelligence 2018, pp. 2227-2233.

Jiang et al., "Deep Cross-Modal Hashing", 2017, pp. 3232-3240.

Koren, "Factorization Meets the Neighborhood: a Multifaceted Collaborative Filtering Model", KDD 2008, Aug. 24-27, 2008, pp. 426-434.

Kumar et al., "Learning Hash Functions for Cross-View Similarity Search", 2011, pp. 1-6.

Li et al., "Deep Binary Reconstruction for Cross-modal Hashing", MM '17, Oct. 23-27, 2017, pp. 1-8.

Li et al., "Deep Collaborative Filtering via Marginalized Denoising Auto-encoder", CIKM '15, Oct. 19-23, 2015, pp. 811-820.

Li et al., "Coupled Cycle-GAN: Unsupervised Hashing Network for Cross-Modal Retrieval", Thirty-Third AAAI Conference on Artificial Intelligence, 2019, pp. 176-183.

Li et al., "Deep Heterogeneous Autoencoders for Collaborative Filtering", 2018, pp. 1-6.

Li et al., "Self-Supervised Adversarial Hashing Networks for Cross-Modal Retrieval", 2018, pp. 4242-4251.

Lian et al., "xDeepFM: Combining Explicit and Implicit Feature Interactions for Recommender Systems", KDD 2018, Aug. 19-23, 2018, pp. 1-10.

Liu et al., "Recommender Systems with Heterogeneous Side Information", WWW '19, May 13-17, 2019, pp. 1-7.

Long et al., "Composite Correlation Quantization for Efficient Multimodal Retrieval", SIGIR '16, Jul. 17-21, 2016, pp. 1-11.

Ricci et al., "Recommender Systems Handbook", 2011.

Sedhain et al., "AutoRec: Autoencoders Meet Collaborative Filtering", WWW 2015 Companion, May 18-22, 2015, pp. 1-2.

Strub et al., "Hybrid Recommender System based on Autoencoders", Workshop on Deep Learning for Recommender Systems, Sep. 2016, pp. 1-7.

Su et al., "Deep Joint-Semantics Reconstructing Hashing for Large-Scale Unsupervised Cross-Modal Retrieval", 2019, pp. 3027-3035.

Takacs et al., "Matrix Factorization and Neighbor Based Algorithms for the Netflix Prize Problem", ReeSys 2008, Oct. 23-25, 2008, pp. 267-274.

Wang et al., "Collaborative Deep Learning for Recommender Systems", KDD '15, Aug. 10-13, 2015, pp. 1235-1244.

Wang et al., "Effective Multi-Modal Retrieval based on Stacked Auto-Encoders", Proceedings of the VLDB Endowment, Sep. 1-5, 2014, pp. 649-660.

Wu et al., "Quantized Correlation Hashing for Fast Cross-Modal Search", Proceedings of the Twenty-Fourth International Joint Conference on Artificial Intelligence, 2015, pp. 3946-3952.

Wu et al., "Unsupervised Deep Hashing via Binary Latent Factor Models for Large-scale Cross-modal Retrieval", Proceedings of the Twenty-Seventh International Joint Conference on Artificial Intelligence, 2018, p. 2854-2860.

Xue et al., "Deep Matrix Factorization Models for Recommender Systems", Proceedings of the Twenty-Sixth International Joint Conference on Artificial Intelligence, 2017, pp. 3203-3209.

Yang et al., "Shared Predictive Cross-Modal Deep Quantization", IEEE Transaction on Neural Networks and Learning Systems, 2019, pp. 1-12.

Zhang et al., "AutoSVD++: An Efficient Hybrid Collaborative Filtering Model via Contractive Auto-encoders", SIGIR '17, Aug. 7-11, 2017, pp. 957-960.

Zhang et al., "Collaborative Quantization for Cross-Modal Similarity Search", 2019, pp. 1-10.

Zhang et al., "Large-Scale Multimodal Hashing with Semantic Correlation Maximization", Association for the Advancement of Artificial Intelligence, 2014, pp. 1-7.

\* cited by examiner

US 11,790,388 B2

SYSTEM, METHOD, AND COMPUTER PROGRAM FOR AUTOMATIC COUPON CODE FILL IN A MOBILE APPLICATION

BACKGROUND OF THE INVENTION

1. Field of the Invention

This invention relates generally to mobile applications and, more specifically, to a system and method for automatic coupon code fill in a mobile application.

2. Description of the Background Art

E-commerce is an increasingly important method for consumers to purchase goods and services and may have overtaken brick-and-mortar stores as the dominant approach. Similar to brick-and-mortar stores, coupons and other rewards are a useful way to save money. Instead of clipping coupons to scan at the store, a consumer can now save coupon codes to his or her user profile. When purchasing a good or service, the consumer would then need to apply the coupon code(s) to his or her purchase on the merchant web site to determine which coupon code(s) would provide the largest reward.

A number of browser extensions are able to detect coupon code fields and test coupon codes on webpages. However, this functionality does not yet exist in mobile applications. This is because a mobile application has less control over web content viewed within the mobile application than a browser extension. As many transactions occur on the go by means of mobile applications, there is a need for a system and method for detecting and filling coupon codes in a mobile domain.

SUMMARY OF THE DISCLOSURE

The present disclosure describes a system, method, and computer program for automatic coupon code fill in a mobile application. The method is performed by a computer system that includes servers, storage systems, networks, operating systems, and databases.

A mobile application launches a software module for analyzing the WebView of a mobile application. The software module, which is injected into a webpage in the WebView, extracts field information from the WebView, and generates a results payload. This is done by identifying a checkout page in the WebView and extracting field data from the checkout page, which it then sends to the mobile application. In certain embodiments, the software module also gathers contextual data and metadata related to the fields and verifies that the field is visible to the mobile application user.

The mobile application sends the results payload to a mapping module on a server, which maps the fields to parameters. A parameter is a value assigned to a field that determines the field type. In such a way, the mapping module identifies a coupon code field and a cart total field from the field data.

The mapping module sends a mapping of the fields to parameters to the mobile application, which relays the mapping along with user profile data (including one or more coupon code(s)) to the software module. The software module tests the coupon code(s) in an iterative fashion by filling the coupon code field with each coupon code sequentially and identifying the best coupon code (i.e., the coupon code that provides the greatest reward in the cart total field), which it will then insert into the coupon code field in the checkout page in the mobile application.

In one embodiment, a method for automatic coupon code fill in a mobile application comprises the following steps:
identifying a checkout page in a WebView of a mobile application;
extracting field data from the checkout page in the WebView of the mobile application;
identifying a coupon code field and a cart total field from the field data;
obtaining one or more coupon code(s);
testing one or more coupon code(s) in the checkout page in the WebView of the mobile application, wherein the one or more coupon code(s) are tested in the identified coupon code field to determine whether any of the coupon code(s) cause the value associated with the cart total field to decrease;
in response to one or more coupon code(s) providing a reward on the checkout page, identifying a best coupon code; and
inserting the best coupon code in the identified coupon code field in the checkout page in the mobile application.

DETAILED DESCRIPTION OF THE PREFERRED EMBODIMENTS

The present disclosure describes a system, method, and computer program for automatic coupon code fill in a mobile application. The method is performed by a computer system that includes servers, storage systems, networks, operating systems, and databases ("the system").

The mobile application allows users to browse e-commerce websites, injects a software module on webpages in response to detecting a coupon code field, and interfaces with a mapping module to provide an automatic coupon code fill capacity. The system identifies a checkout page in a WebView of a mobile application and extracts field data from the checkout page. The system identifies a coupon code field and a cart total field from the field data. The system obtains one or more coupon code(s) and tests the one or more coupon code(s) in the checkout page. The one or more coupon code(s) are tested in the identified coupon code field to determine whether any of the coupon code(s) cause the value associated with the cart total field to decrease. In response to one or more coupon code(s) providing a reward (e.g., a cashback value, points, or other consumer benefit) on the checkout page, the system identifies a best coupon code, which it inserts in the identified coupon code field in the checkout page in the mobile application.

Figure 1:
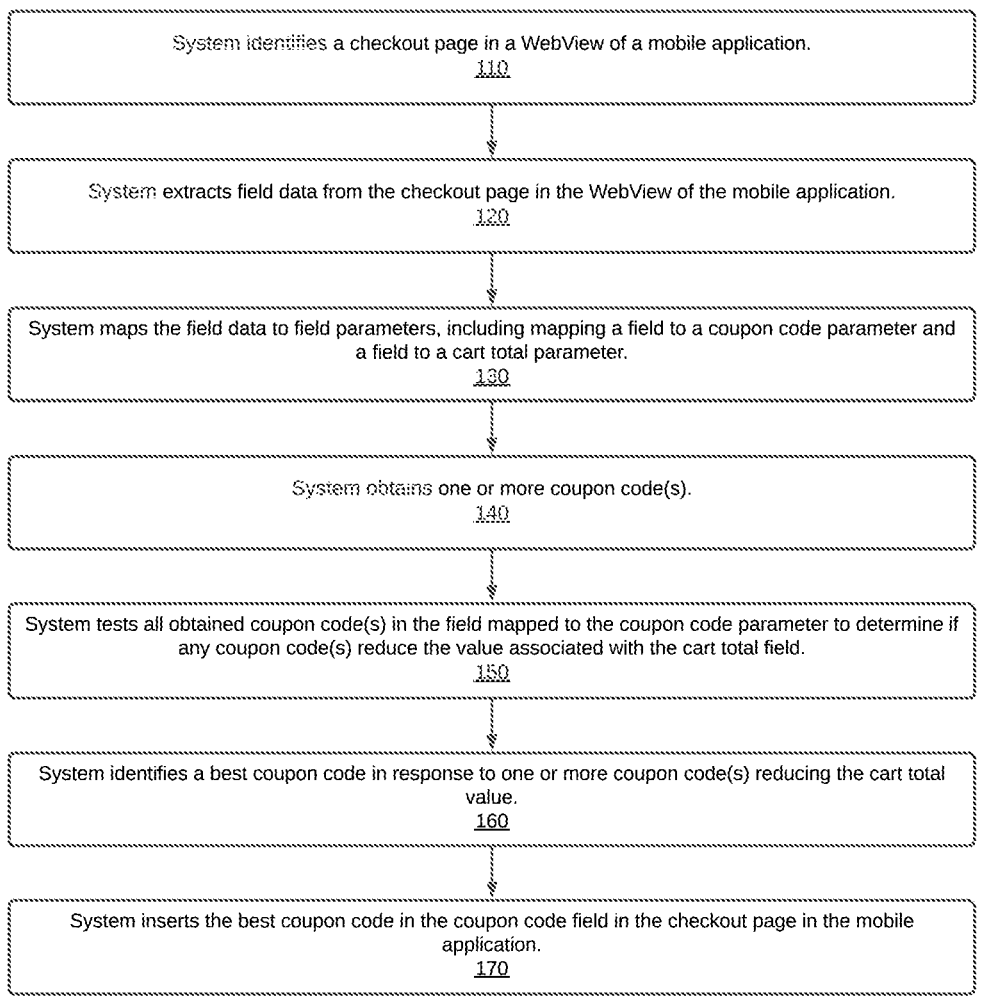
FIG. 1 is a flowchart that illustrates a method, according to one embodiment, for automatic coupon code fill in a mobile application.
Figure 2:
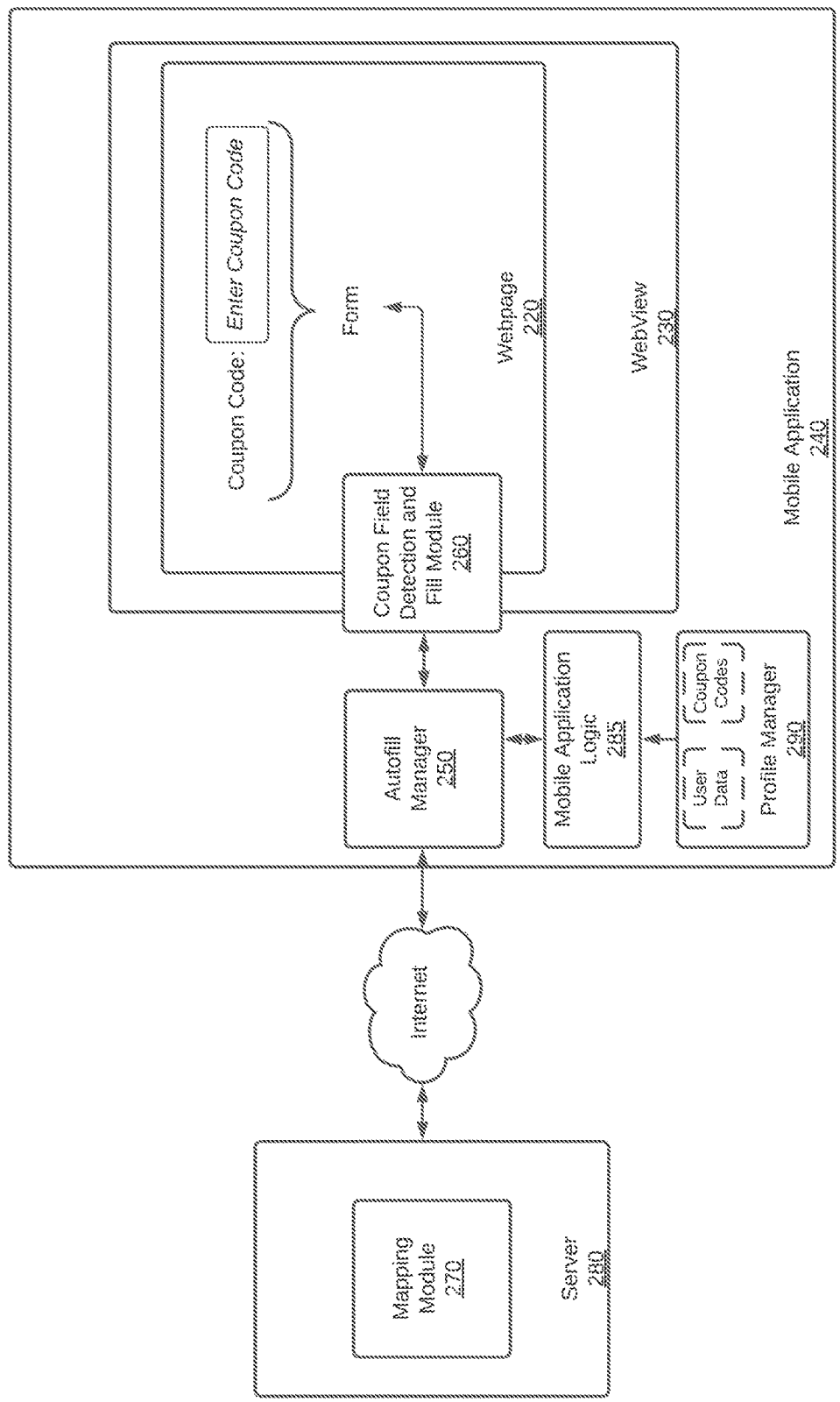
FIG. 2 is a block diagram that illustrates an example software architecture according to one embodiment.
Figure 3:
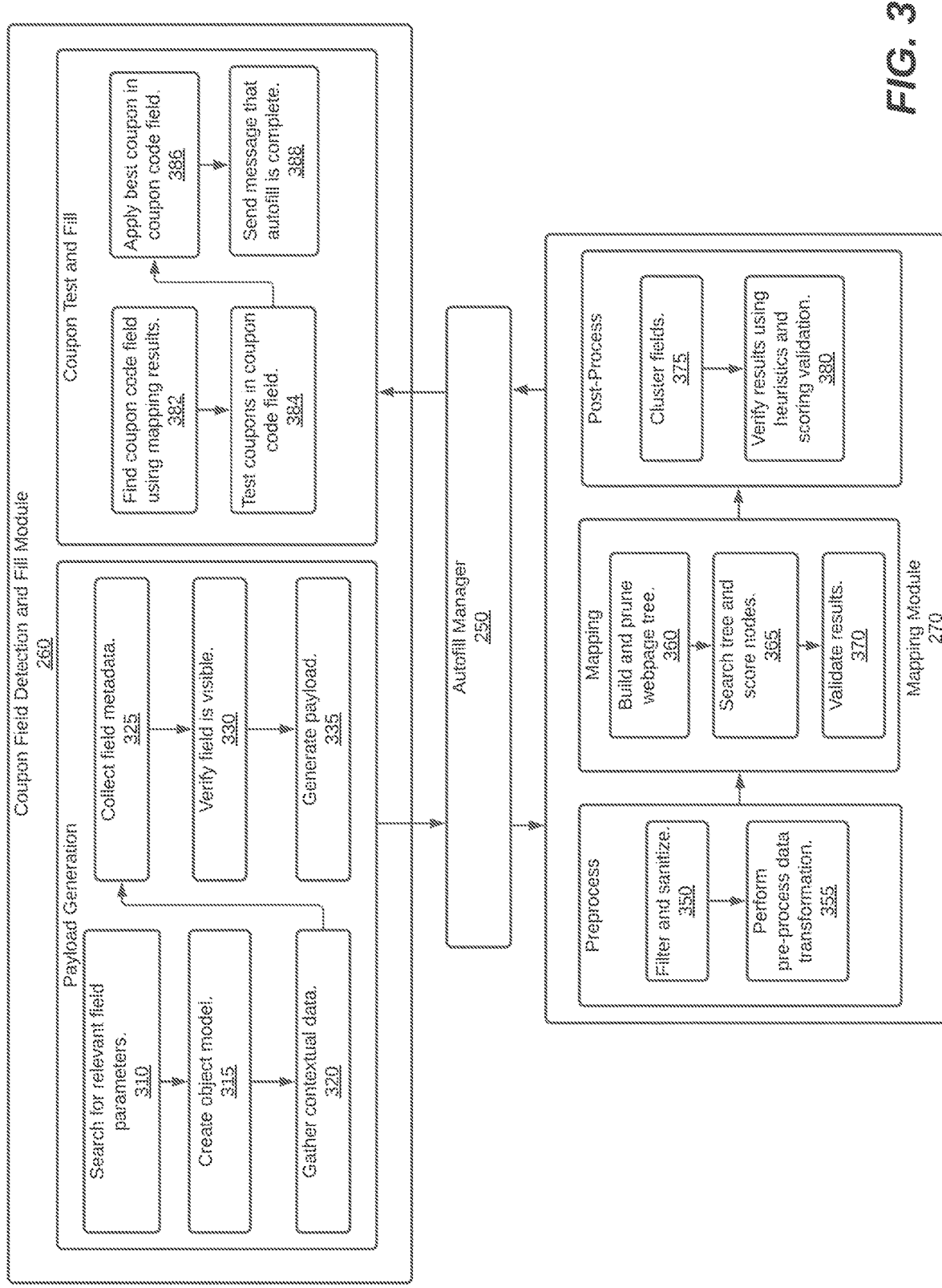
FIG. 3 is a flowchart that illustrates methods, according to one embodiment, performed by one or more software module(s) within the system illustrated in FIG. 2.

Example implementations of the method are described in more detail with respect to FIGS. 1-3.

1. METHOD FOR AUTOMATIC COUPON CODE FILL IN A MOBILE APPLICATION

FIG. 1 illustrates a method for automatic coupon code fill in a mobile application. The system identifies a checkout page in a WebView of a mobile application (step 110). In certain embodiments, a cart scraper detects that it is on a checkout page by using both the URL and the elements on the page to see if either one matches a keyword from a defined list. For example, if the URL contains the keyword "cart" or "checkout," the system determines that the page is a checkout page. If an element on the page has the keyword "checkout" or "total-price," the system will likewise determine that the page is a checkout page. Along with this positive keyword identification, the system also uses a list of negative keywords (e.g., homepage). If either the URL or an element on the page contains a negative keyword, then the system determines that the page is not a checkout page (even if there was a positive keyword identification).

The system extracts field data from the checkout page in the WebView of the mobile application (step 120). In certain embodiments, extracting field data includes creating an object model of the webpage. The system searches for labels associated with the coupon code and cart total fields to identify potential coupon code and cart total fields, where the search is performed using the object model and the webpage. The system gathers contextual data around the identified fields, collects metadata for the identified fields, verifies the identified fields are visible to the user, and generates a payload with the contextual data and metadata for the identified fields. In certain embodiments, the metadata includes field metadata (e.g., HTML name, IDs, input type, etc.), inferred field metadata (e.g., a custom input type that is not HTML-compliant, labels deduced by the software module algorithm, etc.), page metadata (e.g., URL), and performance information.

The system identifies a coupon code field and a cart total field from the field data by mapping the field data to field parameters, including mapping a field to a coupon code parameter and a field to a cart total parameter (step 130). A field parameter is a value that indicates a field type. For example, a coupon code field on a webpage would be mapped to a "CouponCode" parameter. The parameter is used by the software module to fill in the relevant user values stored in the mobile application. In certain embodiments, identifying the coupon code and cart total fields includes creating a vector representation of each field in the field data, applying a neural network to the vector representations of the fields in the field data, and obtaining a predicted coupon code field and cart total field from the neural network. In certain embodiments, the system preprocesses the data (e.g., language translation) prior to mapping. In certain embodiment, the system post-processes the data to verify that the field is correctly mapped using various heuristics and contextual data.

In certain embodiments, the mapping process includes extracting metadata from the extracted field data from the checkout page. The system creates a payload of the metadata (e.g., in JSON) and uploads the payload of the metadata to a server. The system generates field parameters from the payload of the metadata using a heuristic approach, a machine-learning approach, or a combination of the two. The system then returns the field parameters as a results payload (e.g., in JSON).

The system obtains one or more coupon code(s) (step 140). In certain embodiments, the system can obtain a maximum number n of coupon code(s). The system tests all obtained coupon code(s) in the checkout page (i.e., in the field mapped to the coupon code parameter) in the WebView of the mobile application to determine if any coupon code(s) reduce the value associated with the cart total field (step 150). In certain embodiments, if there are multiple coupon codes, the system tests each coupon code in an iterative fashion by inserting each coupon code sequentially in the coupon code field and scraping the cart page to determine the reward provided in the cart total field. In certain embodiments, if a coupon code is displayed on a webpage, the user can copy the coupon code to his or her clipboard and the software module will automatically fill in the coupon code in the coupon code field. In certain embodiments, the cart total field is automatically updated upon entering the coupon code in the coupon code field. In certain embodiments, a user needs to perform an action (e.g., pressing a button) before the cart total field will be updated. In certain embodiments, the system displays the coupon code(s) being tested and the amount saved, if the coupon code is successful, in the mobile application user interface.

The system identifies a best coupon code (i.e., the coupon code in the coupon code field that provided the greatest reward in the cart total field) in response to one or more coupon code(s) reducing the cart total value (step 160). The system inserts the best coupon code in the coupon code field in the checkout page in the mobile application (step 170). In certain embodiments, the system displays an amount saved in the mobile application after inserting the best coupon code in the identified coupon code field.

In certain embodiments, the steps of identifying a checkout page, extracting field data, testing coupon codes, identifying a best coupon code, and inserting the best coupon code in the coupon code field are performed by a software module injected into the webpage in the WebView by the mobile application. In certain embodiments, the software module is a JavaScript code injected into the WebView to harvest field information, send the field information back to the mobile application for mapping, and populate the fields with user data from the mobile application. In certain embodiments, the software module generates a payload with the extracted field data, and the mobile application sends the payload to a server, which maps the field data in the payload to one or more field parameter(s), where a field parameter is a value that indicates a field type. In certain embodiments, the server returns the field parameter mappings to the mobile application, and the software module injected into the webpage uses the field parameter mappings to find the coupon code field on the webpage and test one or more coupon(s) in the coupon code field.

2. EXAMPLE SYSTEM ARCHITECTURE

FIG. 2 illustrates an example architecture for a system that performs the method described herein. However, the method described herein may be implemented in other systems and are not limited to the illustrated system. As seen in FIG. 2, the system identifies a webpage (e.g., a checkout page) 220 within a WebView 230 of a mobile application 240. An autofill manager 250 launches a coupon field detection and fill module 260, which extracts field data (e.g., labels and headings) from the webpage 220 and generates a results payload. The results payload containing the field data is passed back to the autofill manager 250, which passes it via the internet to the mapping module 270 on a server 280. In certain embodiments, the mapping module is a cloud-hosted server backend that contains an autofill mapping algorithm and determines which values should be auto-filled into each form field. The mapping module 270 maps the field data to field parameters, including mapping a coupon code field to a coupon code parameter and a cart total field to a cart total parameter. In certain embodiments, the mapping of field data to field parameter is assigned a confidence score. The mapping module 270 passes the mapping (i.e., field data to field parameters) back to the autofill manager 250 of the mobile application 240.

The autofill manager 250 requests the mobile application logic 285 to obtain user profile data and one or more coupon code(s) from the user profile manager 290. The autofill manager 250 passes the mapping along with the user profile data and coupon code(s) to the coupon field detection and fill module 260, which tests the coupon code(s) in the field mapped to the coupon code parameter to determine if any coupon code(s) reduce the value associated with the field corresponding to the cart total. The coupon field detection and fill module 260 identifies a best coupon code in response to one or more coupon code(s) reducing the cart total value and inserts the best coupon code in the coupon code field in the webpage 220 in the mobile application 240.

FIG. 3 illustrates exemplary methods performed by one or more software module(s) within the system illustrated in FIG. 2. More specifically, FIG. 3 illustrates the methods performed by the coupon field detection and fill module 260, the autofill manager 250, and the mapping module 270. The coupon field detection and fill module 260 handles two processes: payload generation and coupon test and fill.

Within the payload generation process, the coupon field detection and fill module 260 searches for relevant field parameters associated with the coupon code field (step 310). It creates an object model (step 315), which is an in-house representation of the webpage for further analysis. The coupon field detection and fill module 260 searches around the coupon code field to gather contextual data (step 320) and to collect field metadata (step 325). It verifies that the field is visible to the user using various algorithms (step 330). The coupon field detection and fill module 260 collates the data and generates a payload for every webpage having a fillable field (step 335).

The payload is then sent to the autofill manager 250, which passes it to the mapping module 270. The mapping module 270 handles the mapping process in three stages: preprocess, mapping, and post-process. Within the preprocess stage, the mapping module 270 receives the payload (e.g., in JSON), filters and sanitizes the field data (step 350), and performs pre-process data transformation (step 355). In certain embodiments, the preprocess stage also includes language translation so that the automatic coupon code fill functions with non-English websites.

Within the mapping stage, the mapping module 270 builds and prunes the webpage tree (step 360). In certain embodiments, this is done by collecting data from the webpage and building a webpage tree whose structure is similar to the webpage but contains only relevant information from the webpage. In certain embodiments, the mapping process includes an algorithm that identifies other labels similar to the coupon code field (e.g., "voucher," "discount code," etc.) to include as relevant information. The mapping module 270 searches the tree and scores nodes (step 365). In certain embodiments, this is done by traversing the webpage tree and assigning a score to each node, which represents how relevant the information from the webpage is to the current context and how well the system identified it. The mapping module 270 validates the results to confirm that the scoring is correct without collisions (step 370).

In the post-process stage, the mapping module 270 clusters fields to ensure that any fields that need to be concatenated (e.g., first name and last name into full name) or put into a specific format is performed (step 375). The mapping module 270 verifies that the results payload is correct using a heuristic approach combined with a scoring validation (step 380).

The results are then sent to the autofill manager 250, which passes them back to the coupon field detection and fill module 260, which performs the coupon test and fill process. Within the coupon test and fill process, the coupon field detection and fill module 260 finds a coupon code field using the mapping results (step 382), tests coupon(s) in the coupon code field (step 384), applies the best coupon in the coupon code field (step 386), and sends a message that the autofill is complete (step 388).

3. GENERAL

The methods described with respect to FIGS. 1-3 are embodied in software and performed by a computer system (comprising one or more computing device(s)) executing the software. A person skilled in the art would understand that a computer system has one or more memory unit(s), disks, or other physical, computer-readable storage media for storing software instructions, as well as one or more processor(s) for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method performed by a computer system for automatic coupon code fill in a mobile application, the method comprising:
    the mobile application launching a software module for analyzing a WebView of a mobile application;
    the mobile application injecting the software module into a webpage in the WebView;
    the software module identifying a checkout page in a WebView of a mobile application;
    the software module extracting field data from the checkout page in the WebView of the mobile application;
    identifying a coupon code field and a cart total field from the field data, wherein identifying a coupon code field and a cart total field from the field data comprises:
        the software module generating a payload with the extracted field data,
        the mobile application sending the payload to a mapping module on a server, wherein the mapping module on the server maps the field data in the payload to one or more field parameter(s) ("the field parameter mappings"), wherein a field parameter is a value that indicates a field type, and wherein the server mapping the field data in the payload to one or more field parameter(s) comprises:
            filtering and sanitizing the field data,
            performing pre-process data transformation,
            building and pruning a webpage tree,
            searching the webpage tree and scoring one or more nodes,
            validating results of the scoring,
            clustering fields and performing any needed concatenation or formatting of fields, and
            verifying results payload using heuristics and scoring validation, wherein the results payload are used to map the fields to parameters,
        the server returning the field parameter mappings to the mobile application, and the software module using the field parameter mappings to find the coupon code field and the cart total field on the webpage;

obtaining one or more coupon code(s);

the software module testing the one or more coupon code(s) in the checkout page in the WebView of the mobile application, wherein the one or more coupon code(s) are tested in the identified coupon code field to determine whether any of the coupon code(s) cause the value associated with the cart total field to decrease;

in response to one or more coupon code(s) providing a reward on the checkout page, the software module identifying a best coupon code; and the software module inserting the best coupon code in the identified coupon code field in the checkout page in the mobile application.

2. The method of claim 1, wherein extracting field data comprises:

creating an object model of the webpage;

searching for labels associated with the coupon code and cart total fields to identify potential coupon code and cart total fields, wherein the search is performed using the object model and the webpage;

gathering contextual data around the identified fields;

collecting metadata for the identified fields;

verifying the identified fields are visible to the user; and generating a payload with the contextual data and metadata for the identified fields.

3. The method of claim 1, wherein the mapping process comprises:

extracting metadata from the extracted field data from the checkout page;

creating a payload of the metadata;

uploading the payload of the metadata to a server;

generating field parameters from the payload of the metadata; and returning the field parameters as a results payload.

4. The method of claim 1, further comprising displaying the coupon code(s) being tested.

5. The method of claim 1, further comprising displaying an amount saved in the mobile application after inserting the best coupon code in the identified coupon code field.

6. The method of claim 1, wherein identifying the coupon code and cart total fields comprises:

creating a vector representation of each field in the field data;

applying a neural network to the vector representations of the fields in the field data; and obtaining a predicted coupon code field and cart total field from the neural network.

7. A non-transitory computer-readable medium comprising a computer program, that, when executed by a computer system, enables the computer system to perform the following steps for automatic coupon code fill in a mobile application, the steps comprising:

the mobile application launching a software module for analyzing a Web View of a mobile application;

the mobile application injecting the software module into a webpage in the WebView;

the software module identifying a checkout page in a WebView of a mobile application;

the software module extracting field data from the checkout page in the WebView of the mobile application;

identifying a coupon code field and a cart total field from the field data, wherein identifying a coupon code field and a cart total field from the field data comprises:

the software module generating a payload with the extracted field data, the mobile application sending the payload to a mapping module on a server, wherein the mapping module on the server maps the field data in the payload to one or more field parameter(s) ("the field parameter mappings"), wherein a field parameter is a value that indicates a field type, and wherein the server mapping the field data in the payload to one or more field parameter(s) comprises:

filtering and sanitizing the field data, performing pre-process data transformation, building and pruning a webpage tree, searching the webpage tree and scoring one or more nodes, validating results of the scoring, clustering fields and performing any needed concatenation or formatting of fields, and verifying results payload using heuristics and scoring validation, wherein the results payload are used to map the fields to parameters, the server returning the field parameter mappings to the mobile application, and the software module using the field parameter mappings to find the coupon code field and the cart total field on the webpage;

obtaining one or more coupon code(s);

the software module testing the one or more coupon code(s) in the checkout page in the WebView of the mobile application, wherein the one or more coupon code(s) are tested in the identified coupon code field to determine whether any of the coupon code(s) cause the value associated with the cart total field to decrease;

in response to one or more coupon code(s) providing a reward on the checkout page, the software module identifying a best coupon code; and the software module inserting the best coupon code in the identified coupon code field in the checkout page in the mobile application.

8. The non-transitory computer-readable medium of claim 7, wherein extracting field data comprises:

creating an object model of the webpage;

searching for labels associated with the coupon code and cart total fields to identify potential coupon code and cart total fields, wherein the search is performed using the object model and the webpage;

gathering contextual data around the identified fields;

collecting metadata for the identified fields;

verifying the identified fields are visible to the user; and generating a payload with the contextual data and metadata for the identified fields.

9. The non-transitory computer-readable medium of claim 7, wherein the mapping process comprises:

extracting metadata from the extracted field data from the checkout page;

creating a payload of the metadata;

uploading the payload of the metadata to a server;

generating field parameters from the payload of the metadata; and returning the field parameters as a results payload.

10. The non-transitory computer-readable medium of claim 7, further comprising displaying the coupon code(s) being tested.

11. The non-transitory computer-readable medium of claim 7, further comprising displaying an amount saved in the mobile application after inserting the best coupon code in the identified coupon code field.

12. The non-transitory computer-readable medium of claim 7, wherein identifying the coupon code and cart total fields comprises:
- creating a vector representation of each field in the field data;
- applying a neural network to the vector representations of the fields in the field data; and
- obtaining a predicted coupon code field and cart total field from the neural network.

13. A computer system for automatic coupon code fill in a mobile application, the system comprising:
- one or more processor(s);
- one or more memory unit(s) coupled to the one or more processor(s), wherein the one or more memory unit(s) store instructions that, when executed by the one or more processor(s), cause the system to perform the operations of:
  - the mobile application launching a software module for analyzing a WebView of a mobile application;
  - the mobile application injecting the software module into a webpage in the WebView;
  - the software module identifying a checkout page in a WebView of a mobile application;
  - the software module extracting field data from the checkout page in the WebView of the mobile application;
  - identifying a coupon code field and a cart total field from the field data, wherein identifying a coupon code field and a cart total field from the field data comprises:
    - the software module generating a payload with the extracted field data,
    - the mobile application sending the payload to a mapping module on a server, wherein the mapping module on the server maps the field data in the payload to one or more field parameter(s) ("the field parameter mappings"), wherein a field parameter is a value that indicates a field type, and wherein the server mapping the field data in the payload to one or more field parameter(s) comprises:
      - filtering and sanitizing the field data,
      - performing pre-process data transformation,
      - building and pruning a webpage tree,
      - searching the webpage tree and scoring one or more nodes,
      - validating results of the scoring,
      - clustering fields and performing any needed concatenation or formatting of fields, and
      - verifying results payload using heuristics and scoring validation, wherein the results payload are used to map the fields to parameters,
    - the server returning the field parameter mappings to the mobile application, and
    - the software module using the field parameter mappings to find the coupon code field and the cart total field on the webpage;
  - obtaining one or more coupon code(s);
  - the software module testing the one or more coupon code(s) in the checkout page in the WebView of the mobile application, wherein the one or more coupon code(s) are tested in the identified coupon code field to determine whether any of the coupon code(s) cause the value associated with the cart total field to decrease;
  - in response to one or more coupon code(s) providing a reward on the checkout page, the software module identifying a best coupon code; and
  - the software module inserting the best coupon code in the identified coupon code field in the checkout page in the mobile application.

14. The system of claim 13, wherein extracting field data comprises:
- creating an object model of the webpage;
- searching for labels associated with the coupon code and cart total fields to identify potential coupon code and cart total fields, wherein the search is performed using the object model and the webpage;
- gathering contextual data around the identified fields;
- collecting metadata for the identified fields;
- verifying the identified fields are visible to the user; and
- generating a payload with the contextual data and metadata for the identified fields.

15. The system of claim 13, wherein the mapping process comprises:
- extracting metadata from the extracted field data from the checkout page;
- creating a payload of the metadata;
- uploading the payload of the metadata to a server;
- generating field parameters from the payload of the metadata; and
- returning the field parameters as a results payload.

16. The system of claim 13, further comprising displaying the coupon code(s) being tested.

17. The system of claim 13, further comprising displaying an amount saved in the mobile application after inserting the best coupon code in the identified coupon code field.

18. The system of claim 13, wherein identifying the coupon code and cart total fields comprises:
- creating a vector representation of each field in the field data;
- applying a neural network to the vector representations of the fields in the field data; and
- obtaining a predicted coupon code field and cart total field from the neural network.

* * * * *